United States Patent [19]

Hancock et al.

[11] Patent Number: 5,668,461
[45] Date of Patent: Sep. 16, 1997

[54] RESERVE BATTERY HAVING TEMPERTURE COMPENSATION

[75] Inventors: Keith Alan Hancock, Castle Rock, Colo.; Joseph Thomas Scopaz, Woodland Hills, Calif.; Gerald Lewis, Las Vegas, Nev.; Thomas Augusto Gutierrez, Laguna Niguel, Calif.

[73] Assignee: Reserve Battery Cell, L.P., Englewood, Colo.

[21] Appl. No.: 600,551

[22] Filed: Feb. 13, 1996

[51] Int. Cl.⁶ .................................................. H01M 10/46
[52] U.S. Cl. .................................................. 320/5; 320/35
[58] Field of Search .............................. 320/5, 9, 10, 11, 320/12, 13, 21, 30, 35, 39, 48, 15; 429/62

[56] References Cited

U.S. PATENT DOCUMENTS

| | | | |
|---|---|---|---|
| 4,675,538 | 6/1987 | Epstein | 307/64 |
| 4,794,058 | 12/1988 | Thiess | 429/116 |
| 4,869,975 | 9/1989 | Eppley et al. | 429/7 |
| 4,925,750 | 5/1990 | Theiss | 429/116 |
| 5,204,610 | 4/1993 | Pierson et al. | 320/15 |
| 5,488,283 | 1/1996 | Dougherty et al. | 320/15 |

*Primary Examiner*—Edward Tso
*Attorney, Agent, or Firm*—Duft, Graziano & Forest, P.C.

[57] ABSTRACT

An electronic control system for a reserve, energy sourced, or deferred action battery that determines start-up temperature and voltage conditions to determine the necessary amount of charge to deliver from a reserve battery to a discharged battery. A temperature sensor is used to measure the ambient temperature and operating temperature of the electronic control system. A target charge value is selected based on the ambient temperature and startup voltage information. The operating temperature of the electronics control system is monitored to ensure the most efficient and reliable delivery of charge. Indications are provided to the user to provide information regarding charging status, connection status, and voltage levels.

13 Claims, 2 Drawing Sheets

RESERVE BATTERY HAVING TEMPERTURE COMPENSATION

FIELD OF THE INVENTION

This invention relates to the field of reserve, energy source, or deferred action batteries. More specifically, the reserve battery of the present invention determines the start-up conditions, including the voltage of a discharged battery and the ambient temperature, to determine the necessary amount of amp-hours of charge to be supplied from the reserve battery to the discharged battery and measures the temperature of the electronic control system to avoid over-heating. An indication is provided to the user that the necessary charge has been delivered. In the start-up stage the electronic control system.

PROBLEM

A variety of reserve or deferred action battery designs are known and have been used for a wide range of applications. A reserve battery is essentially a battery in which the electrolyte fluid is stored separately from the battery plates in a separate container or reservoir. The reserve battery might be stored in this fashion for a long period of time, i.e., five years or more. The reserve battery must be activated in order to draw electrical power from the reserve battery. Activation of the reserve battery involves transferring the electrolyte fluid from its storage reservoir to the battery cells in which the plates are located. The electrolyte fluid then contacts the plates and the reserve battery is activated. From this point, the reserve battery operates as a standard lead-acid battery.

Reserve batteries are commonly maintained in their storage or non-activated state for long periods of time. As a result, it is difficult for one to know the temperature conditions under which the battery must operate upon activation. This is especially true if the reserve battery might be used outdoors and be subject to the temperature swings possible in that environment. Also, reserve batteries can be used for a wide variety of applications including charging automobile, boat, and recreational vehicle batteries. In fact, a reserve battery might be used to power or charge any device requiring DC voltage, or with an AC adaptor, any device requiring AC power. Not knowing the temperature at which the reserve battery must operate causes several problems for the designer of a reserve battery.

A common application for a reserve battery is charging a discharged automobile battery. This application is exemplary of the problems existent with prior art reserve battery designs. The purpose of an automobile's battery when starting the automobile is to supply current to the automobile's starter motor to cause the starter motor to turn. It is the turning of the starter motor that causes the automobile's engine to begin to run. It is known that in cold temperatures a greater charge must be available in the automobile's battery than is required in warm temperatures in order to provide the necessary current to the starter motor. This is due to the greater mechanical force necessary to start a cold automobile engine. Thus, if one is recharging a discharged automobile battery from a reserve battery, the reserve battery needs to be connected to the discharged automobile battery for a longer period of time or deliver the current at a higher charging rate in order to provide the necessary charge to the automobile battery. Reserve batteries of the prior art, however, do not provide a means for adjusting the charging rate or the charging time based on the ambient temperature.

U.S. Pat. No. 4,794,058 to Theiss (1988) and U.S. Pat. No. 4,925,750 also to Theiss (1990) describe a reserve battery system with the intended application of charging a discharged car battery. A method and apparatus are described for alerting the user when a target amount of charge, 1 amp-hour, has been delivered from the reserve battery to the discharged battery of the automobile. This target amount of charge is constant, however, and is not varied according to the ambient temperature. Thus, the 1 amp-hour of charge that may be sufficient to start a certain car's battery at 60 degrees F., may not be sufficient to start the same car's battery at −10 degrees F.

Another issue in charging a discharged battery from a reserve battery is regulating the flow of current from the reserve battery to the discharged battery. In certain applications, it is necessary to not exceed a certain flow of current. For example, automobile cigarette lighters are typically fused with a 10 amp fuse. Since the reserve battery delivers charge to the car battery through the cigarette lighter socket of the automobile, it is desired that the current be delivered at a constant level but a level not exceeding approximately 10 amps. If the fuse rating is exceeded then the fuse opens and no further charging of the car's battery is possible.

U.S. Pat. No. 4,869,975 to Eppley et al. (1989) describes a circuit for limiting the flow of current, especially at the time of activation, from a reserve battery. The potential current flow from a reserve battery is greatest just after the reserve battery is activated. This patent describes the use of a thermal fuse which is connected in series with a resistor, the thermal fuse and resistor being connected in parallel with the load to be charged by the reserve battery. At startup, the thermal fuse is closed and provides a current path to shunt a portion of the current flow from the reserve battery away from the load to be charged. After some amount of time, predetermined by selection of the thermal fuse, the fuse opens and all of the current flow from the reserve battery is directed to the load to be charged. This means of controlling the current from a reserve battery has several drawbacks. The current limitation is limited by the life of the thermal fuse. After the fuse opens there is no longer any limit on the current flowing from the reserve battery. Another limitation is that the designer of such a device is forced to sub-optimize the design of the control circuitry with a safety factor that allows for variation in the properties of the thermal fuse and the range of possible ambient temperature conditions. The result is that the current flow from the reserve battery is more limited than what is necessary thereby building inefficiencies into the operation of the reserve battery.

A common approach for regulating the flow of current from a reserve battery is to use a power transistor and an inductor. Proper operation of the power transistor requires that the temperature of the power transistor not exceed certain specified levels. The power transistor is prone to heating since it is being used to regulate relatively large amounts of current. An example of this type of current regulation is found in the Theiss patents noted above. Reserve batteries of the prior art have been designed such that the power transistor does not exceed its specified temperature limit given the possible range of operating temperatures for the reserve battery. This means that only under worst case temperature conditions is the reserve battery delivering the maximum rate of charge. At all other times the reserve battery is delivering a rate of charge less than what is achievable. In the application of charging a discharged car battery, this could mean that the user might, for example, be forced to wait 15 minutes for the car's battery to be sufficiently charged as opposed to only waiting 10 minutes if optimum current were delivered.

There remains a need for a reserve battery control system which adjusts the target output of the reserve battery based on the ambient temperature at the time the reserve battery is operated. There is an additional need for a reserve battery which delivers a target amount of charge in the shortest time possible while not exceeding a certain maximum current flow and given the operating constraints of the componetry used to regulate the current.

SOLUTION

The present invention overcomes the above problems by providing a reserve battery control system which senses ambient and operating conditions. In response to ambient temperature conditions, a target charge is selected. That target charge is then delivered to the car battery in the shortest time possible while not exceeding a certain maximum current flow. An acceptable operating temperature of the electronic control system is also maintained.

In broad terminology, a electronic control system according to the present invention is used to connect a discharged battery to a reserve battery for the purpose of recharging the discharged battery. The electronic control system controls the charging process, based on the ambient temperature at the start of the charging process and the temperature of the electronic control system during the charging process. The electronic control system selects a target amount of charge to deliver to the discharged battery based on the ambient temperature. The electronic control system includes a current regulator which is governed by a microprocessor to regulate the flow of current from the reserve battery to the discharged battery. When the target amount of charge has been delivered to the discharged battery, the electronic control system notifies a user that the charging process is complete. In addition to the above advantages, during the charging process, the electronic control system ensures that the current regulator maintains a proper operating temperature.

In the preferred embodiment of the present invention, the operation of the electronic control system occurs in a start-up stage and a charging stage. In the start-up stage, the electronic control system determines the start-up conditions including the voltage of the car battery, and the ambient temperature. The electronic control system then utilizes the start-up condition information to select the appropriate target charge. During the charging stage of operation, the electronic control system delivers the target charge from the reserve battery to the discharged battery as quickly as possible without overheating the current regulator or exceeding the current rating of the cigarette lighter fuse.

In the start-up stage of operation, the electronic control system first recognizes that the reserve battery has been activated. If the electronic control system measures a voltage on the discharged battery that indicates that the discharged battery is actually fully charged, the electronic control system indicates to the user that there is some problem other than a discharged battery. The next step in the start-up stage is for the microprocessor to read the ambient temperature from a temperature sensor. The ambient temperature measured at the start of the charging process is representative of the temperature of the discharged battery and the car in which the discharged battery is located. The microprocessor uses the ambient temperature reading to select a target amount of charge to be delivered from the reserve battery to the discharged battery. In a preferred embodiment of the present invention, the microprocessor reduces the target charge if the voltage of the discharged battery at the start of the charging process is relatively high. In this way the user does not have to wait longer than necessary to attempt to start their car.

Once proper connections with a discharged car battery have been established and the target charge has been selected, the charging stage of the electronic control system's operation begins. As mentioned above, an advantage of the present invention is optimizing the rate of current flow from the reserve battery to the discharged battery. Delivering the highest possible current is an objective related to time savings for the user. For example, assume a target charge of 1.0 amp-hour. The target charge is achieved if current is delivered from the reserve battery to the car battery at a constant rate of 6 amps for 10 minutes (6 amps×10 min.=60 amp-minutes or 1.0 amp-hour). However, the target charge is achieved in 6 minutes if current is delivered at a constant rate of 10 amps (10 amps×6 min.=60 amp-minutes or 1.0 amp-hour). The user then waits only 6 minutes as opposed to 10 minutes before starting their car. Therefore, for a given target charge, it is desired to deliver the charge in the shortest time possible, which equates to delivering the charge at the highest current possible.

There are two factors limiting the rate at which current can be delivered. One is the current capacity of the circuitry used to carry the current. In the case of the present invention this means the cigarette lighter wiring and fuse. In a preferred embodiment of the present invention, a maximum current rate of 10 amps is used in order to not cause the cigarette lighter fuse to open. Another factor limiting the rate at which current can be delivered is the operating characteristics of the current regulating components used in the electronic control system. Current regulators typically generate heat due to the high rates of current and resultant heat dissipation. It is important that the current regulator temperature be maintained below a specific maximum temperature to ensure proper operation. This requirement is sometimes at odds with the desire to deliver current at the highest rate possible and the electronic control system of the present invention is designed to strike a balance between the two objectives. Overheating of the current regulator can cause the electronic control system to fail, a quality issue, and can even cause a safety issue if the overheated current regulator should cause damage to the user or other equipment.

During the charging stage, the microprocessor continuously monitors the circuit temperature using a temperature sensor. In response to the circuit temperature, the microprocessor sends signals to the current regulator which govern the rate of current flow. The microprocessor might direct a lower rate of current through the current regulator, for example, when a relatively high circuit temperature is sensed. Also during the charging stage, the microprocessor keeps track of the total amount of current delivered by the reserve battery and compares that amount against the target charge. When certain levels of charging are attained, as for example 33% of target charge, the electronic control system lights various LED's indicating the appropriate progress to the user. Ultimately the user receives an indication, through the lighting of the appropriate LED, that the discharged battery has received the target charge amount and the car can be started.

Another task performed by the electronic control system during the charging stage is the relatively precise control of the rate of current flow. The microprocessor senses the actual current flow and compares that to the target current flow. For example, in the present invention, the maximum rate of current is 10 amps. If the microprocessor senses an actual rate of current of 11 amps, signals are generated to adjust, or trim, the actual rate of current to avoid causing the cigarette lighter fuse to short circuit.

Other salient features, objects, and advantages are apparent to those skilled in the art upon a reading of the discussion below in combination with the accompanying drawings.

DETAILED DESCRIPTION OF THE PREFERRED EMBODIMENT

Figure 1:
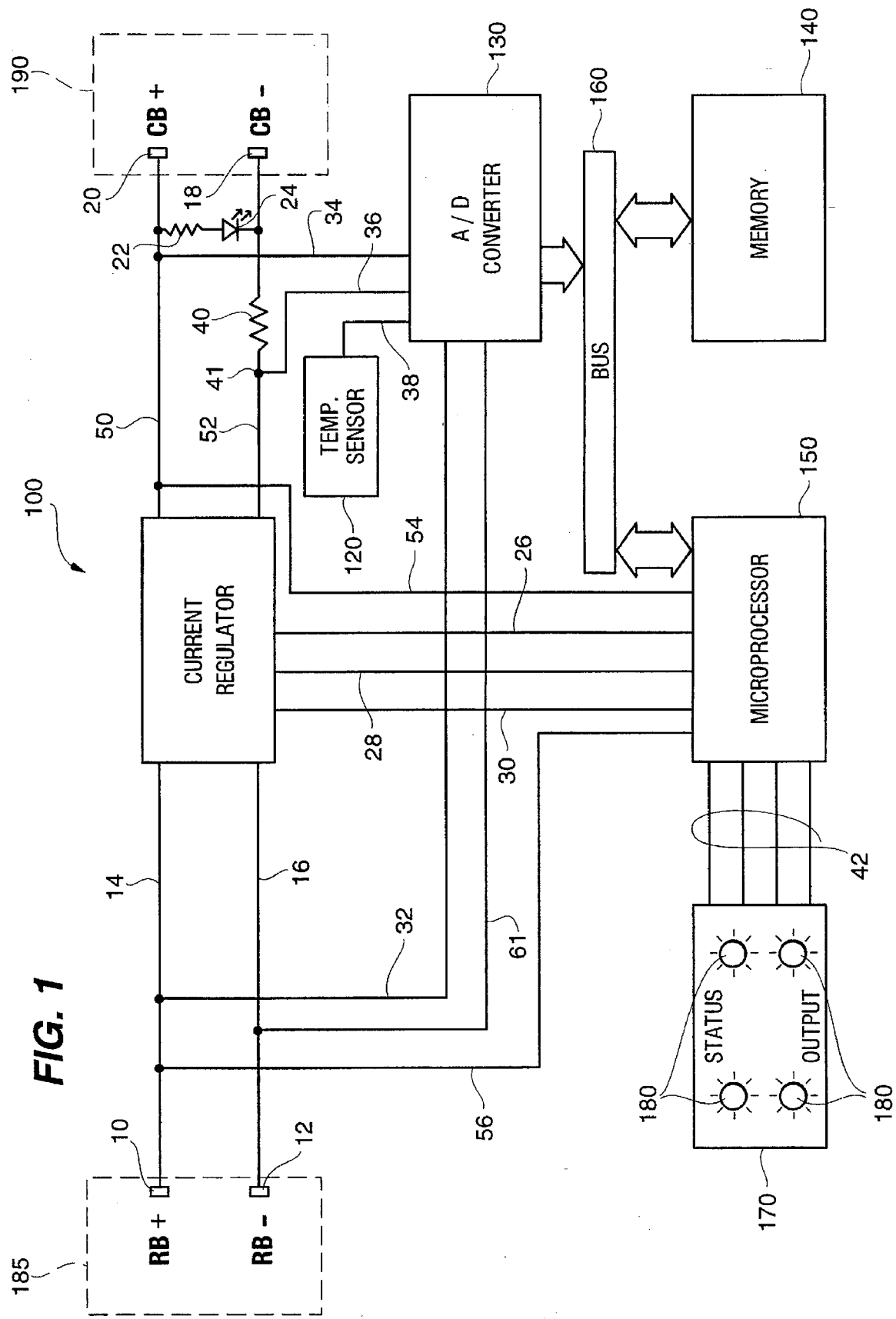
FIG. 1 depicts a block diagram of a reserve battery control system.

FIG. 1 depicts a reserve battery electronic control system 100. Major components of electronic control system 100 include a current regulator circuit 110; a microprocessor 150, an analog to digital converter (ND converter) 130, a memory unit 140, a temperature sensor 120, and a status output circuit 180. Microprocessor 150, A/D converter 130, and memory 140 all exchange information over a bus 160. In the preferred embodiment of the present invention, all of these components are located in a common housing.

In FIG. 1, a reserve battery 185 is connected at contacts 10 and 12. The positive terminal of reserve battery 185 is connected to contact 10 and the negative terminal of a reserve battery is connected to contact 12. A discharged car battery 190 to be charged by the reserve battery is connected at contacts 18 and 20. The positive terminal of car battery 190 is connected to contact 20 and the negative terminal of car battery 190 is connected to contact 18.

Current regulator 110 controls the rate of current that flows from the reserve battery to car battery 190. Temperature sensor 120 provides an output which is proportional to the temperature of electronic control system 100. Temperature sensor 120 is one of any available thermistor-type devices such as a resistive temperature detector (RTD). A temperature sensor 120 accurate to within about 10% will suffice for application in the present invention. A/D converter 130 accepts various signals and converts those signals from analog signals to digital signals and thereafter communicates those signals to microprocessor 150 over communication bus 160. Microprocessor 150 also communicates with memory unit 140 over bus 160. Microprocessor 150, in response to various inputs, sends signals over lines 26, 28, and 30 to current regulator 110. Current regulator 110 in turn controls the rate of current to car battery 190.

Figure 2:
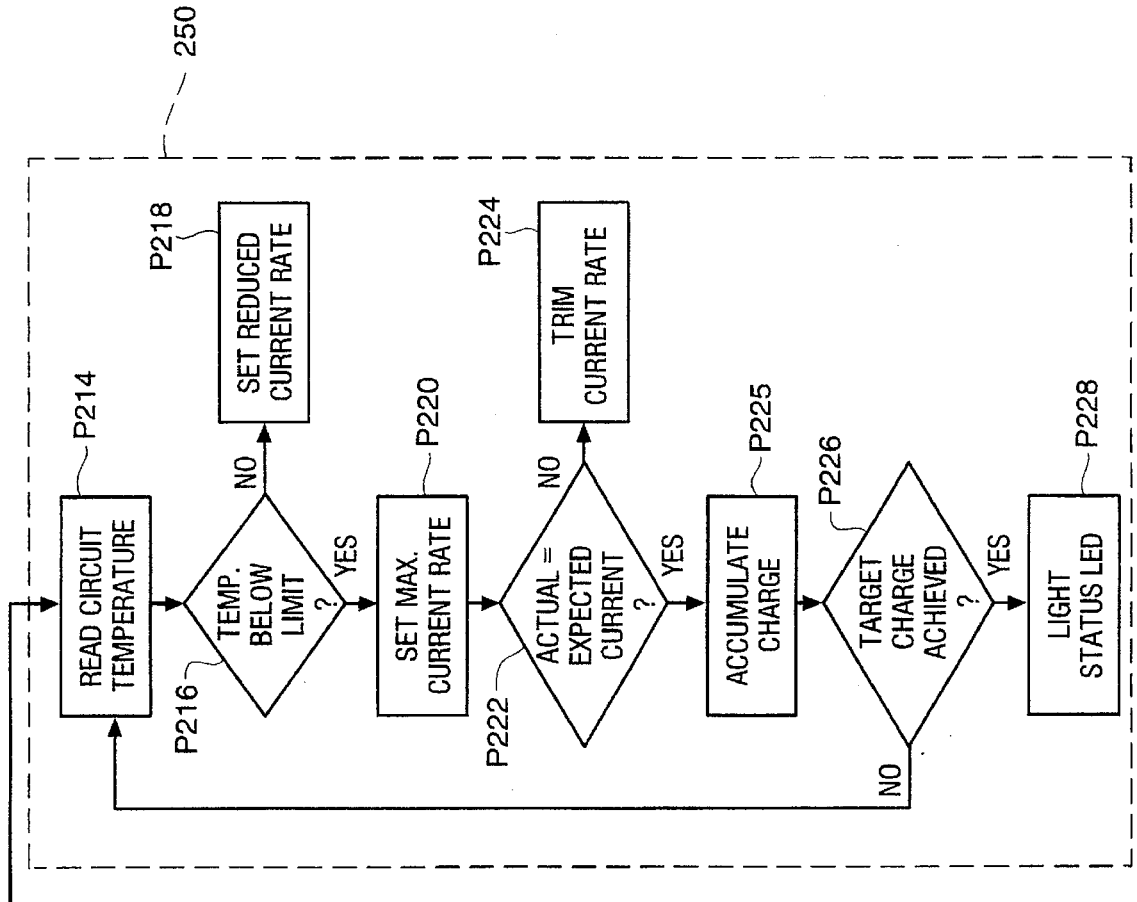
FIG. 2 is a flow chart representing the operation of a reserve battery electronic control system.
Figure 2:
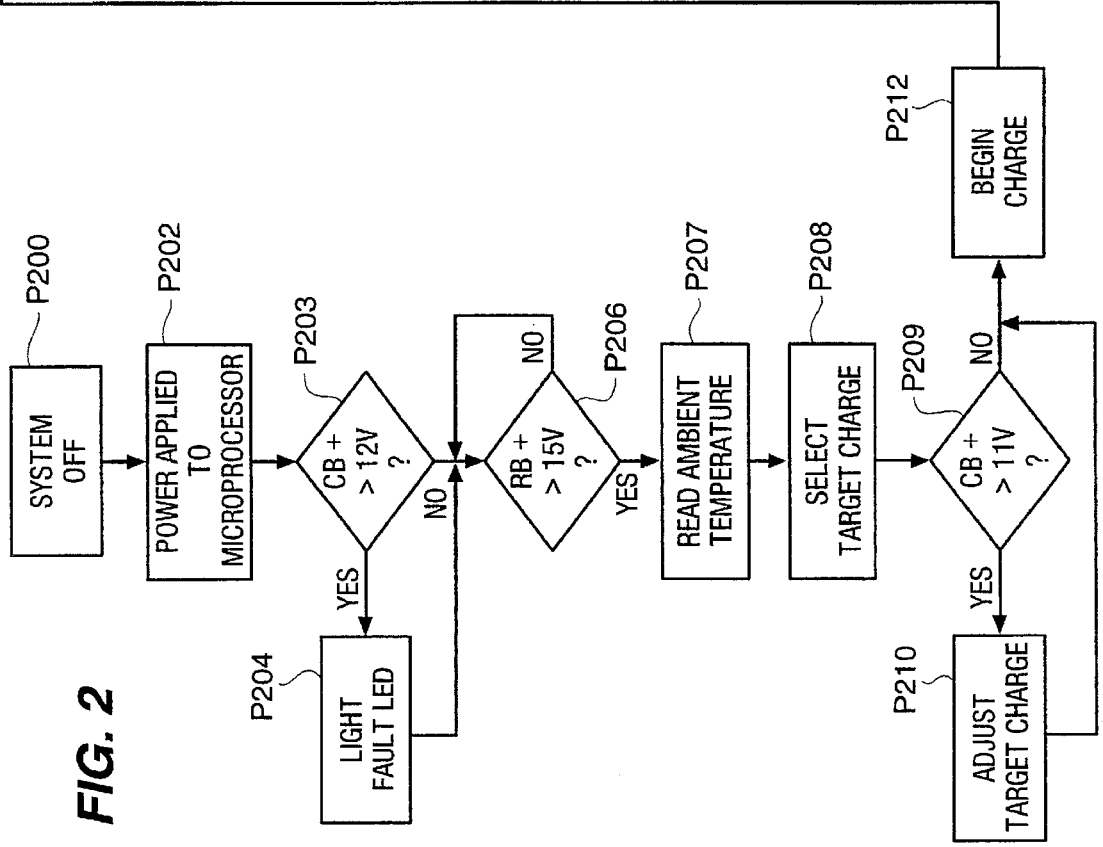

FIG. 2 is a flow chart depicting the operations performed by microprocessor 150. Operation of electronic control system 100 is described with respect to FIGS. 1 and 2. During step P200, reserve battery 185 has not been activated. This means that the user has not taken whatever steps are necessary to bring the electrolyte fluid of reserve battery 185 into contact with the battery plates of reserve battery 185. Therefore, there is no voltage present between connectors 10 and 12. Activation of a reserve battery is typically accomplished through the pushing of a button, depression of a plunger, or some other manual means. The user next manually connects electronic control system 100 to car battery 190. In the preferred embodiment this is done by inserting a plug (not shown) into the car's cigarette lighter receptacle connecting the positive terminal of car battery 190 to connector 20 and the negative terminal of car battery 190 to connector 18. Even though car battery 190 may not provide a voltage sufficient to start a car, there is still a residual voltage between contacts 20 and 18 provided by car battery 190. The voltage between connectors 20 and 18 causes a current to flow through resistor 22 and LED 24. The lighting of LED 24 indicates to the user that a successful connection has been made between car battery 190 and electronic control system 100.

During Step P202 power is applied to microprocessor 150 through one of two means as described below. Microprocessor 150 then reads the voltage of car battery 190. A voltage level is conducted to A/D converter 130 over lines 34 and 35 which represents the voltage of car battery 190. This voltage level representing the initial car battery voltage is converted to a digital signal by A/D converter 130 and communicated over bus 160 to microprocessor 150. Microprocessor 150 stores the initial car battery voltage value in a register in memory 140.

There are two ways that power is applied to microprocessor 150 to initiate Step P202. One means is through the activation of reserve battery 185. When reserve battery 185 is activated, microprocessor 150 receives a supply voltage over lines 56 and 57 and Step P202 is initiated. The other means by which microprocessor 150 can be powered and Step P202 initiated is if there is sufficient residual voltage in car battery 190. It is possible that car battery 190 provides sufficient voltage over lines 54 and 55 to microprocessor 150 whereby microprocessor 150 is powered up. In the preferred embodiment, a residual voltage in car battery 190 of 9 Volts is sufficient to cause microprocessor 150 to be powered.

In Step P203 microprocessor 150 compares the initial car battery voltage value stored in memory 140 during Step P202 to a reference voltage value stored in memory 140. Microprocessor 150 compares the initial car battery voltage value to the reference voltage value to determine if car battery 190 is in need of charging. This initial check is done so that the user can avoid activating the reserve battery, if they haven't already done so, if the problem with their car is something other than a discharged battery. If, in the preferred embodiment, the initial car battery voltage exceeds a reference voltage of 12 volts, then Step 204 occurs, otherwise Step P206 occurs. In Step P204 microprocessor 150 sends a signal over line 42 to light one of status LEDs 180 to indicate to the user that there is some other problem with the car besides a discharged battery. In the preferred embodiment, a red LED is lighted if Step P204 occurs. Line 42 comprises at least one conductor for communicating signals from microprocessor 150 to status output circuit 170. After Step P204, Step P206 occurs.

In Step P206, microprocessor 150 checks to see if reserve battery 185 has been activated. If reserve battery 185 has not been activated, microprocessor 150 will wait at Step P206 until reserve battery 185 has been activated. If reserve battery 185 has been activated, as indicated by a voltage differential of more than 15 volts between contacts 10 and 12 over lines 32 and 61, the charging process continues with Step P207.

In Step P207 microprocessor 150 receives an ambient temperature signal over bus 160 from ND converter 130. The temperature signal is the digitally converted signal supplied by temperature sensor 120 to ND converter 130. This signal represents the ambient temperature of electronic control system 100. Since, during storage, Electronic control system 100 is stored in the automobile having the discharged battery, the ambient temperature signal of electronic control system 100 represents a temperature similar to the temperature of the car having a discharged battery.

In Step P208 microprocessor 150 selects and stores the target charge value in response to the ambient temperature.

The target charge is the amount of charge, in amp-hours, that electronic control system 100 delivers to car battery 190. It is known that a cold battery requires a greater charge, i.e., more amp-hours, than a warm battery to start a car. Therefore the target charge selected is based on the ambient temperature reading. In the preferred embodiment, a look up table, as illustrated below, is used for the selection of the target charge by microprocessor 150.

| | |
|---|---|
| t < 0° F. | 2.25 amp-hours |
| 0° F. < t < 32° F. | 2.0 amp-hours |
| t > 32° F. | 1.5 amp-hours |

Thus, for example, if the ambient temperature is less than 0° F., microprocessor 150 selects 2.25 amp-hours as the target charge. Microprocessor 150 then stores the target charge value in a register in memory 140. The target charge values in the table above are those used in the preferred embodiment of the invention and are tailored to the application of recharging discharged automobile-type batteries. One skilled in the art will recognize that these values can be modified or tailored for this or other applications.

In Step P209, microprocessor 150 determines if the initial car battery voltage exceeds a certain voltage. This step is performed because, although the user's car does not start, their cars battery may be very close to having a sufficient charge for starting. The user, in that case, should not have to wait the full charging time if it is not necessary that their car's battery receive the full target charge in order to be able to start their car. In the preferred embodiment, if the initial car battery voltage exceeds 1.5 volts, then Step P210 is performed, otherwise Step P212 is performed.

In Step P210, microprocessor 150 adjusts the target charge value by dividing the target charge value by two and storing the new target charge value in memory 140. Thus, for example, if in Step P209 the initial car battery voltage is greater than 11.5 volts, then in Step P210 the target charge selected from the look up table in Step P208 for example, 2.25 amp-hours, is divided by 2 and the result, 1.125 amp-hours, is stored in memory 140.

In Step P212, microprocessor 150 sends a signal over line 26 to current regulator 110 causing current regulator 110 to pass current from reserve battery 185 to car battery 190. This is the start of the actual charging stage of operation for electronic control system 100. Current regulator 110 comprises one of many known methods for regulating current. For example, a pulse width modulator driving the gate of a power field effect transistor in combination with a choke could be used. In Step 212 the current regulator is directed to cause the maximum allowable rate of current to flow to car battery 190. In the preferred embodiment this is equal to 10 amps.

In Step P214, microprocessor 150 reads the temperature of temperature sensor 120 through ND converter 130 and bus 160. This temperature no longer represents the ambient temperature because, with the start of the charging process, current regulator 110 is dissipating heat. Thus the temperature indicated by temperature sensor 120 represents the circuit temperature.

In Step 216, microprocessor 150 compares the circuit temperature value from Step P214 with a circuit temperature threshold value retrieved from memory 140 over bus 160. If the circuit temperature value exceeds the circuit temperature threshold value, then Step P218 is performed, otherwise Step P220 is performed.

In Step P218, microprocessor 150 changes the signal over line 26 to current regulator 110 thereby reducing the rate of current flow through current regulator 110 to o car battery 190. In order to reliably operate current regulator 110, its temperature must be maintained at levels within the specified operating range of current regulator 110. For example, if a power FET is used as one of the components in current regulator 110, reliable operation of the power FET might require it be operated at temperatures below 170° F. In the preferred embodiment, if a circuit temperature of more than 170° F. is sensed by microprocessor 150 in Step P214, then in Step P218 a signal is communicated over line 26 to current regulator 110 which cuts the rate of current flow in half to approximately 5 amps. Electronic control system 100 operates at this reduced rate of current flow until current regulator 110 cools below the circuit temperature threshold value.

In Step P220, microprocessor 150 communicates a signal over line 26 to current regulator 110 to cause current regulator 110 to transmit current to car battery 190 at the maximum allowable rate. In the case of the preferred embodiment, the maximum allowable current rate is 10 amps.

In Step P222, microprocessor 150 compares the actual current rate to the expected current rate. The actual current is represented and measured as a voltage at connection 41 and transmitted over line 36 to ND converter 130. A value representing the actual current is communicated over bus 160 to microprocessor 150. If, for example, microprocessor 150 expects current regulator 110 to be delivering 10 amps to car battery but, in fact, current regulator 110 is delivering 11 amps to car battery, Step P224 is performed, otherwise Step P225 is performed.

In Step P224, microprocessor 150 provides signals to current regulator 110 to adjust or trim the current rate. If the actual current value differs from the expected current value, microprocessor 150 sends signals over lines 28 and 30 to current regulator 110 to cause the output of current regulator 110 to be trimmed and more closely approximate the expected current. The components used in electronic control system 100, and in particular current regulator 110, are subject to variation. Thus, there is likely to be variation in the rate of current delivered by current regulator 110 to car battery 190. The operation of Step P224 serves to correct for the variation in components and ensures that electronic control system 100 is delivering the intended current to car battery 190. The operation of Step P224 allows electronic control system 100, and in particular current regulator 110, to be constructed of relatively inexpensive components which may tend to vary in their performance characteristics more than more expensive components. These effects, however, are minimized by the trimming operation of Step P224.

In Step P225, electronic control system 100 keeps track of the amount of charge delivered to car battery 190. The current value received by microprocessor 150 in Step P222 is accumulated by microprocessor 150 over bus 160 in an accumulation register in memory 140. Because the operations of microprocessor 150 are driven by a clock, each of the steps, including Step 225, occur at regular time intervals. As a result, the actual current value accumulated in the accumulation register in memory 140 represents actual amp-hours delivered to car battery 190. For example, if the actual current value, measured in Step P222, for a given microprocessor 150 interrupt, or cycle, is 10 amps and the interrupt time of microprocessor 150 is 1 sec, then a value of 10 amp-seconds is added to the accumulation register in memory 140. This accumulation occurs once every interrupt, once per second in the above example, and has the effect of integrating the actual current delivered to car battery 190.

In Step P226, microprocessor 150 retrieves the total charge delivered value from the accumulation register in memory 140 over bus 160 and also retrieves the target charge value from memory 140 over bus 160. Microprocessor 150 compares the two values and if the total charge delivered value is equal to or exceeds the target charge value then Step P228 is performed, otherwise the operation of electronic control system 100 is returned to operation of Step P214.

Step P214 begins another cycle with the operation of reading the circuit temperature. The operation of electronic control system 100 continues to return to this step until the target charge has been achieved.

In Step P228, microprocessor 150 lights a status light indicating to the user that the target charge has been achieved. Microprocessor 150 sends a signal over line 42 lighting one of status lights 180. This tells the user that car battery 190 has been sufficiently charged and that the user may now attempt to start the car.

In a preferred embodiment of the present invention, intermediate target charges are set with intermediate status lights indicating the progress of the charging process. For example, in the preferred embodiment it is desired to cause one of status lights 180 to blink, an orange LED in the case of the preferred embodiment, when reserve battery is activated. When car battery 190 has achieved 33% of the target charge, the first blinking orange LED of status lights 180 is caused to remain on and a second orange LED of status lights 180 begins to blink. When the target charge is achieved, the two orange LEDs of status lights 180 are caused to turn off, and another of status lights 180, a green LED, is lighted indicating that the target charge achieved has been delivered to car battery 190.

Lighting multiple status lights 180 at various intermediate steps during the charging process is accomplished by adding additional steps after Step P228. The additional steps are effectively repeats of a series 250 of steps shown in FIG. 2, the only difference being that the target charge value compared to at the end of the repeated series 250 is different than the target charge value used in the previous series 250. In the preferred embodiment, series 250 is repeated twice. In Step P228 (the first series 250), a value equal to 33% of the target charge value is compared to the total charge delivered value. In the repeated series 250 (not shown), a value equal to 100% of the target charge value is compared to the total charge delivered value. This series of steps, series 250, could, of course, be repeated as many times as one desires to provide the necessary level of feedback to the user.

In a further embodiment of the present invention, electronic control system 100 provides a fault indication, in the form of a blinking red LED of status lights 180, if the connection to car battery 190 is broken. This might occur, for example, if the connection between electronic control system 100 and car battery 190, a plug (not shown), containing contacts 18 and 20, inserted into the cigarette lighter portal (not shown), is inadvertently knocked from the cigarette lighter portal. In this event, microprocessor 150 reads an open circuit voltage of zero volts from car battery 190 over line 34 and ND converter 130. Microprocessor 150 sends signals over line 42 to cause a red LED in status lights 180 to blink. Microprocessor 150 also stores the total charge delivered value in memory 140. When the connection with car battery 190 is re-established, microprocessor 150 retrieves the total charge delivered value from memory 140 and continues generating a value equal to the total charge delivered as described above.

It is to be expressly understood that the claimed invention is not to be limited to the description of the preferred embodiment but encompasses other modifications and alterations within the scope and spirit of the inventive concept.

We claim:

1. In a battery charging system for recharging a discharged battery from a reserve battery, an apparatus for providing a charge from said reserve battery to said discharged battery as a function of an ambient temperature of said battery charging system, said apparatus comprising:

ambient temperature measurement means for determining an ambient temperature value representative of said ambient temperature, selection means, responsive to said ambient temperature value, for selecting a predetermined target charge value, said target charge value representing the amount of said charge to be delivered from said reserve battery to said discharged battery; and control means for delivering said charge from said reserve battery to said discharged battery in an amount substantially equal to said target charge value.

2. The apparatus of claim 1 wherein:

said selection means includes memory means containing a plurality of said target charge values, each said target charge value being associated with a range of said ambient temperature values.

3. The apparatus of claim 1 wherein said selection means further comprises:

voltage input means for determining a discharged battery voltage value representative of the voltage of said discharged battery, initial voltage comparing means, responsive to said discharged battery voltage value, for comparing said discharged battery voltage value to a voltage threshold value; and division means, responsive to said initial voltage comparison means, for reducing said target charge value if said discharged battery voltage value exceeds said voltage threshold value.

4. The apparatus of claim 1 wherein said control means further comprises:

current measurement means for measuring the rate of a current delivered from said reserve battery to said discharged battery, accumulation means, responsive to said current, for determining a delivered charge value representing the amount of said charge delivered from said reserve battery to said discharged battery, charge value comparison means for determining when said delivered charge value exceeds said target charge value; and indication means, responsive to said charge value comparison means, for sending a signal to an output means to indicate completion of at least a portion of the charging process.

5. The apparatus of claim 1 wherein said control means further comprises:

current measurement means for measuring the rate of a current delivered from said reserve battery to said discharged battery, current regulation means for regulating said current from said reserve battery to said discharged battery; and control signal generation means, responsive to said current measurement means, for sending signals to said current regulation means whereby said current regulation means maintains a first desired current rate.

6. The apparatus of claim 5 wherein said control means further comprises:

operating temperature measurement means for determining an operating temperature value representative of an operating temperature of said current regulation means; and wherein said control signal generation means is also responsive to said operating temperature value for sending signals to said current regulation means whereby said current regulation means maintains a second desired current rate.

7. The apparatus of claim 6 wherein a single temperature sensor is used as said operating temperature measurement means and as said ambient temperature measurement means.

8. In a battery charging system for recharging a discharged battery from a reserve battery, a method for providing a charge from said reserve battery to said discharged battery as a function of an ambient temperature of said battery charging system, said method comprising the steps of:

measuring said ambient temperature to determine an ambient temperature value representative of said ambient temperature, selecting, responsive to said ambient temperature value, a predetermined target charge value, said target charge value representing the amount of said charge to be delivered from said reserve battery to said discharged battery; and delivering said charge from said reserve battery to said discharged battery in an amount substantially equal to said target charge value.

9. The method of claim 8 wherein said selecting further comprises:

selecting said predetermined target charge value from a plurality of said target charge values, each said target charge value being associated with a range of said ambient temperature values.

10. The method of claim 8 wherein said selecting further comprises the steps of:

determining a discharged battery voltage value representative of the voltage of said discharged battery, comparing said discharged battery voltage value to a voltage threshold value; and reducing said target charge value if said discharged battery voltage value exceeds said voltage threshold value.

11. The method of claim 8 wherein delivering said charge further comprises the steps of:

measuring the rate of a current delivered from said reserve battery to said discharged battery, determining a delivered charge value representing the amount of said charge delivered from said reserve battery to said discharged battery, determining when said delivered charge value exceeds said target charge value; and sending a signal to an sending a signal to an output means to indicate completion of at least a portion of the charging process.

12. The method of claim 8 wherein delivering said charge further comprises:

measuring the rate of a current delivered from said reserve battery to said discharged battery, regulating said current from said reserve battery to said discharged battery whereby said current maintains a first desired current rate.

13. The method of claim 12 wherein delivering said charge further comprises the steps of;

determining an operating temperature value representative of an operating temperature of said current regulation means; and sending signals responsive to said operating temperature value to said current regulation means whereby said current regulation means maintains a second desired current rate.

* * * * *